(12) United States Patent
Kalyadin et al.

(10) Patent No.: US 8,738,531 B1
(45) Date of Patent: May 27, 2014

(54) CRYPTOGRAPHIC DISTRIBUTED STORAGE SYSTEM AND METHOD

(75) Inventors: Oleg A. Kalyadin, Moscow (RU);
Alexander G. Ivanov, Moscow (RU);
Andrey A. Kuzekin, Moscow (RU);
Dmitry A. Shustikov, Moscow (RU)

(73) Assignee: InfoWatch, Moscow (RU)

( * ) Notice: Subject to any disclaimer, the term of this patent is extended or adjusted under 35 U.S.C. 154(b) by 1331 days.

(21) Appl. No.: 12/169,061

(22) Filed: Jul. 8, 2008

(51) Int. Cl.
*G06Q 99/00* (2006.01)
*G06Q 20/00* (2012.01)

(52) U.S. Cl.
CPC ............ *G06Q 20/00* (2013.01); *G06Q 2220/00* (2013.01)
USPC .......................................................... 705/50

(58) Field of Classification Search
USPC .......................................................... 705/50
See application file for complete search history.

(56) References Cited

U.S. PATENT DOCUMENTS

| | | | | |
|---|---|---|---|---|
| 5,677,952 A * | 10/1997 | Blakley et al. | ................ | 713/189 |
| 6,047,363 A * | 4/2000 | Lewchuk | ...................... | 711/213 |
| 6,957,330 B1 * | 10/2005 | Hughes | .......................... | 713/163 |
| 7,403,622 B2 * | 7/2008 | Diehl et al. | ................... | 380/278 |
| 7,480,806 B2 * | 1/2009 | Grawrock | ..................... | 713/189 |
| 7,515,717 B2 * | 4/2009 | Doyle et al. | ................... | 380/277 |
| 7,650,498 B2 * | 1/2010 | Goh et al. | ...................... | 713/161 |
| 7,685,645 B2 * | 3/2010 | Doyle et al. | ...................... | 726/27 |
| 8,145,907 B2 * | 3/2012 | Asokan et al. | ................ | 713/170 |
| 2002/0120763 A1 * | 8/2002 | Miloushev et al. | ........... | 709/230 |
| 2003/0046366 A1 * | 3/2003 | Pardikar et al. | ............... | 709/219 |
| 2003/0108206 A1 * | 6/2003 | Diehl et al. | ................... | 380/277 |
| 2003/0163711 A1 * | 8/2003 | Grawrock | ..................... | 713/189 |
| 2005/0010760 A1 * | 1/2005 | Goh et al. | ...................... | 713/161 |
| 2005/0039034 A1 * | 2/2005 | Doyle et al. | ................... | 713/193 |
| 2005/0188421 A1 * | 8/2005 | Arbajian | ............................ | 726/4 |
| 2007/0016781 A1 * | 1/2007 | Asokan et al. | ................ | 713/173 |
| 2008/0175391 A1 * | 7/2008 | Finkelstein et al. | .......... | 380/278 |
| 2008/0215897 A1 * | 9/2008 | Doyle et al. | ................... | 713/193 |
| 2009/0157551 A1 * | 6/2009 | Bellwood et al. | ............... | 705/50 |
| 2009/0172018 A1 * | 7/2009 | Brochard et al. | ......... | 707/103 Y |
| 2009/0240705 A1 * | 9/2009 | Miloushev et al. | ............. | 707/10 |

FOREIGN PATENT DOCUMENTS

WO    WO2005/091553  A1  *  9/2005  ................ H04L 9/32

OTHER PUBLICATIONS

Shamir (Adi Shamir, "How to Share a Secret", Communications of the ACM, vol. 22, No. 11, Nov. 1979, 2 pages).*

* cited by examiner

*Primary Examiner* — James D Nigh
(74) *Attorney, Agent, or Firm* — Bardmesser Law Group (57) ABSTRACT

A method for controlling access to protected objects in a distributed environment, including providing a user key $K_U$ corresponding to a public key $K_{UP}$ of a user; receiving a server key $K_S$ from a remote server; generating the combination key $K_C$ by decrypting a metadata field $Data_i$ using the key $K_U$. The public key $K_{UP}$ is used to generate the metadata field $Data_i$, and the metadata field $Data_i$ is stored as part of a protected object's metadata. The object key $K_{OBJ}$ is calculated from the combination key $K_C$ and the server key $K_S$ by either XORing the combination key $K_C$ and the server key $K_S$, or by decrypting the combination key $K_C$ using the server key $K_S$. The object key $K_{OBJ}$ is used to encrypt and decrypt the protected object. A user who has access to the protected object having structure has access to any unprotected file or unprotected structured objected inside the structured protected objected, but does not have access to any structured protected object without an additional key.

19 Claims, 5 Drawing Sheets

CRYPTOGRAPHIC DISTRIBUTED STORAGE SYSTEM AND METHOD

BACKGROUND OF THE INVENTION

1. Field of the Invention

This invention relates to a method, system and computer program product for controlling access to data in a distributed environment.

2. Description of the Related Art

Security of information is a problem that is an issue for many corporate organizations, whether small or large. A number of conventional mechanisms exist to ensure various degrees of security for corporate data. The most common mechanism involves server-based systems, such as server-based document systems, where access rights are defined for each document (or for groups of documents), and for each user (or groups of users). There are many examples of such centralized, server-based document management systems, which are readily commercially available from a number of vendors.

One problem with such server-based security systems is the fact that an administrator normally has the highest privilege level in the system, and therefore can gain access to any data on the corporate network. As such, the security, and the level of trust in the system, is only as good as the level of trust in the person of the administrator himself or herself.

Another disadvantage of such server-based systems is that many corporate networks consist of not only servers and terminals (such as, for example, desktop computers that function as terminals), but also laptop and notebook computers, which many users take with them "on the road." It is frequent practice for a user to download information, in the form of files or folders, to his laptop computer, after which point, security of that information is only as good as the security of the laptop itself.

Another conventional security mechanism involves cryptography, for example, the use of passwords (and encryption keys derived from the passwords), for protection of particular files or other object that contain data that needs to be protected. However, in conventional systems, the problem of the "omnipotent" administrator remains—usually some entity, such as a system administrator, is in charge of the security aspect as well, and therefore has access to the password files, or at least access to data not just in encrypted form, but also in unencrypted form. Therefore, the use of encryption in conventional systems does not automatically ensure that information is safe from the administrator. This, in turn, necessitates having a very high degree of trust in the administrator, particularly given the fact that this individual presumably has access to all the sensitive and confidential data that exist on the corporate network.

By definition, confidential information is information, access to which is restricted to a particular group of people. Restricting access to resources, such as that provided by operating systems, is generally insufficient for controlling access to confidential information, because such operating system-based access control generally requires an administrator to manage the access control. As such, the administrator becomes one individual who has access to all the confidential information. The problem is essentially independent of which operating system is used—all that is necessary is for the malicious user to have administrative rights in order to gain access to the information on a removable storage medium.

Another problem with conventional mechanisms for data security lies in the fact that the object that is protected, such as a file or a folder that contains files, can be copied on to some medium, such as a flash drive, and then an attempt to access the medium can be made. Many such conventional mechanisms are vulnerable to a malicious user who acquires the system level of privileges on some machine, and then attempt to gain access to encrypted data that is stored on some removable medium.

Another problem with conventional encryption mechanisms is the fact that for many users, remembering more than a small handful of passwords (and/or keys) is impractical. As such, many users use the same one or two passwords for many of their activities. Thus, a malicious hacker or a malicious administrator, after learning one password for one file or object, can often gain access to a great deal of other data.

Another problem with conventional methods is the fact that working with encrypted information is generally very inconvenient for users—before working with a encrypted object, such as a file or a folder, that object needs to be decrypted, and once the user is done working with the information, the object has to be re-encrypted, and any unencrypted copies need to be destroyed. These operations, particularly if performed frequently, often leads to mistakes and errors, for example, users forgetting to erase temporary files, users writing down their passwords, users forgetting to encrypt the final document, and so on. As the volume of such actions increases, particularly for document intensive operations, guarding against such mistakes and errors becomes merely impossible.

Yet another problem is that equipment failure, particularly when the encryption process has not been completed, can leave unencrypted data available to a malicious user, typically in some form of nonvolatile storage. Also, in some cases, given equipment failure, it is at times difficult to tell where exactly the encryption operation was interrupted, and therefore difficult to tell which part of the data, if any, did not get encrypted. This, in turn, can lead to a loss of confidential information.

Another problem with conventional systems is that encryption algorithms can be relatively computationally intensive. As such, where large volumes of data, such as large files, or entire disk drives, needs to be encrypted, this can take a relatively long time. It is therefore desirable to give the user an ability to work with the storage device, such as a disk drive, even while the encryption process is going on.

Yet another weakness of conventional encryption systems is that typically conventional block encryption algorithms work with relatively small increments of data, such as 8, 16, or 32 byte increments. On the other hand, most storage devices, such as disk drives, typically work with much larger units of data, such as blocks or sectors that are 512 bytes in length, or 1024 bytes in length, and so forth. If long data streams are broken down into very small portions and encrypted independently, then monitoring the encrypted versions of the data can identify localized spots where data has been changed. This gives some indirect information about contents of the encrypted data. Therefore, it is desirable that a change in one bit somewhere in a protected object's plaintext results in changes in the ciphertext that are not localized.

Another problem with conventional systems is that the size of the file might not be an even multiple of the block size of the encryption algorithm, and the operating system may not be responsible for security of data that is located outside the file boundary.

Another practical problem, if not a theoretical problem, is that confidential information is primarily useful if it is accessible by more than one person. For conventionally encrypted data, this means that everyone with access to that data needs to have the same key. The flip side of this is that if all the confidential information is encrypted using the same key, then any user who has access to any portion of that information therefore has access to all the data, even data that is not intended for his use and his access.

On the other hand, if the confidential data is broken down into multiple subsets of data, each with its own encryption key, which is preferable from the perspective of data security, then a user who needs to have access to all the data will have difficulties resulting from having to keep track of numerous keys and passwords. Typically, such multiplicity of keys and passwords leads to compromising the integrity of the data, due to various "human failings" of most users.

Yet another problem in handling confidential data in a multi-user environment results from one, out of several, users who have access to that encrypted data, losing his access rights. For example, this can happen when an employee leaves the company. In conventional systems, this means that to ensure security, the file needs to be re-encrypted using a different key, and a new key needs to be distributed to all the users who still retain access rights to that data. This is burdensome for everyone involved. It is therefore desirable to handle the situation without direct involvement of the remaining users who have access to the data.

Confidential information is frequently structured. For example, a great number of users might have access to confidential information of a general nature. The more specific the information, the smaller the circle of people who have access to that information. It is therefore desirable for a system that handles information security to be able to address this fact.

Yet another problem with conventional mechanisms is that various applications have different ways of handling protected files. For example, a word processing application might make a copy of the file, can make a copy of a file with a different name, can rename the original file, can create a new file with the same name as the old file, at the same location, and so forth. If the software applications are not integrated in any way with the mechanism for handling access control, then such file operations can lead to a loss of security, particularly where frequent decryptions and encryptions need to occur.

Use of public key infrastructure can lead to a substitution of the public key of the user to a public key of a malicious user. A variation on this form of cryptographic attack is an addition of a fictional user (i.e., another public key) to the access list. The added user does not have actual access to the particular object, but the malicious user hopes for the possibility that during the next re-encryption of the file, or the creation of a new file in a protected folder (or during the editing of an earlier file with creation of a new copy), the new user will gain "legitimate" access to that file. To address this problem, it is necessary to constantly review the list of people with access to the object, looking for fictitious users.

Yet another problem with conventional systems is the use of fictitious stubs. Normally, use of public key infrastructure encryption and hash functions does not require the knowledge of a secret key. This means that a malicious user who knows the data formats that are used, and who selects a key for file encryption, can correctly encrypt that file, provide the file with an access list of real users, and place it into a protected folder. Such a fictitious object will appear no different than any other real objects, and therefore will be initially trusted by other users. Such a fictitious object can be used for disinformation. It can also be used as a Trojan horse, where the file is used as a template by applications that work with files on the system. As a result, the malicious user can gain access to a final document, which contains real confidential data. Therefore, identification of such fictitious objects, which were not created using legitimate mechanisms, is also desirable.

As such, there is need in the art for a more robust system for security of information, particularly in the context of network distributed data storage, and particularly where most of the methodology used to implement the security is substantially transparent to the users.

SUMMARY OF THE INVENTION

Accordingly, the present invention is related to a system, method and computer program product for a cryptographic-based distributed storage system that substantially obviates one or more of the disadvantages of the related art.

In one aspect of the invention, there is provided a system, method and computer program product for controlling access to protected objects in a distributed environment, including providing a user key $K_U$ corresponding to a public key $K_{UP}$ of a user; receiving a server key $K_S$ from a remote server; generating the combination key $K_C$ by decrypting a metadata field $Data_i$ using the key $K_U$. The public key $K_{UP}$ is used to generate the metadata field $Data_i$, and the metadata field $Data_i$ is stored as part of a protected object's metadata. The object key $K_{OBJ}$ is calculated from the combination key $K_C$ and the server key $K_S$ by either XORing the combination key $K_C$ and the server key $K_S$, or by decrypting the combination key $K_C$ using the server key $K_S$. The object key $K_{OBJ}$ is used to encrypt and decrypt the protected object.

The protected object is stored on local storage, or on remote storage. The protected object can be a file, a folder, a volume, a partition, a container, a disk drive, or a dynamic volume. A user who has access to the protected object having structure (such as a folder, a container, etc.) has access to any unprotected file or unprotected structured object inside the structured protected object, but does not have access to any structured protected object inside the protected object without an additional key. Transparent encryption is used to interface to a storage device on which the protected object is stored, such that any copy of the protected object is always encrypted when present on the storage device. Each protected object includes several $Data_i$ such that each $Data_i$ can be decrypted into a derivative key of the object key $K_{OBJ}$, such that same $Data_i$ can be decrypted into the object key $K_{OBJ}$ using several derivative keys generated by an (N,K) algorithm.

For any protected object, when storing the protected object in encrypted form, a hash value is generated for each plaintext unit of the protected object that corresponds to a portion of a disk sector, and the hash value is then added to the remaining portion of the disk sector, and the result is used as an initialization vector for encryption of the protected object. Each structured protected object has a unique secret identifier (SID), and each file within a structured protected object has a unique secret identifier (SID), wherein both SIDs are stored together and both are required to access any file inside the structured protected object, in order to control the integrity of a structured protected object. A log of accesses of the protected objects based on requests to the server for the server keys can be maintained on the administrative server. A loader is activated prior to loading an operating system into memory, wherein the loader requires a user key and a server key received from the administrative server to permit decryption of operating system files. An offline ticket of limited time duration is provided from the administrative server to enable access to the protected object if the computer system is offline.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

In general, there are several types of actors in the system, as contemplated in this discussion:

A user is an entity (normally, a human being) who works with the contents of the protected object, based on the policies set by the system administrator and by an owner of the object.

An owner is a user who has rights to create and delete the object. An owner is frequently one who creates the object, and typically has additional rights with regard to the object, compared to ordinary users. Also, the owner defines which other users have access to the object. In essence, an owner is a type of user with more administrative rights to the protected object. Note also that although frequently the owner is the creator of the object, this is not always the case, since a user can create an object, and then designate another user as the owner. Note also that the rights of the owner with regards to giving access to a particular protected object to other users can be limited by various system policies, set by the administrator. Also, the rights of the owner with regard to removing protection from the protected object altogether can also be restricted by the administrator.

An administrator is an individual who sets the access policies of the users to protect its objects, and has some control over the actions of the users relative to the protected objects. An administrator normally does not have access to the protected objects in their decrypted (plaintext) form.

A recovery agent is a special type of user, who, in combination with other recovery agents, can gain access to the object. Typically, a recovery agent comes into play when the keys are lost or stolen, or inaccessible, etc. Typically, every object (that has recovery agents) has at least two, but usually more than two, recovery agents.

Note that a single individual can, sometimes, play several roles, particularly with regard to different objects. In other words, an owner of one object can be a user of another object, and a recovery agent for several others.

Finally, to generate the plaintext object, the input to the decryption function is the encrypted object, and the key is the just-generated object key $K_{OBJ}$.

One of the solutions to the problems identified above is that access to a protected object is granted based on two conditions—physical access to the protected object, and knowledge of the secret key used for the encryption. If the secret key and the administrative rights for physical access to the object are given to different people, then the problem of the "omnipotent" system administrator is addressed.

Another solution to some of the problems identified above is not relying on the user himself to encrypt and decrypt protected information, but using transparent encryption, where any time a protected object is being accessed, or worked with, by a software application, the data that is actually written to or read from the hard disk drive is always in encrypted form (as long as correct keys are used). The only thing that the user needs to provide is the correct encryption key or a password (from which the key can be derived). Thus, the approach described herein is also independent of the actual software application that uses the protected object— whether it is a word processing program, a browser, etc.—the relevant point is that the only contents of the protected object that reaches the storage medium is in its encrypted form.

As described herein, in addition to the secret keys used for encryption of the object ($K_{OBJ}$), users can also have their personal secret keys for accessing the object. For each user given access to the protected object, the object key $K_{OBJ}$ is encrypted using user key $K_U$ and server key $K_S$, and the result of the encryption, together with the user identifier, is stored together with the protected object itself. A user, in order to access a protected object, needs to go through two steps—the user enters a key or password (from which the key can be generated), and then the encryption object key $K_{OBJ}$ is decrypted. The latter is then provided to a device driver used for transparent encryptions/descriptions, which is then used to generate the plaintext object from the ciphertext.

A user has a secret key $K_U$ and a corresponding public key $K_{UP}$. The data of the protected object is encrypted using the object key $K_{OBJ}$. The object key $K_{OBJ}$ is generated randomly for each protected object. Also, for each protected object, there is a corresponding server key $K_S$, which is typically unique (or, with 128 bit long keys, virtually guaranteed to be unique) for each object. The object key $K_{OBJ}$ is protected by the server key $K_S$, using either an XOR operation, or by encrypting $K_{OBJ}$ on the key $K_S$. Thus, $K_C = K_{OBJ}$ XOR $K_S$, or $K_C = \text{Encrypt} K_S (K_{OBJ})$. The metadata field Data$_i$ is the result of encryption of the key $K_C$ using the public key $K_{UP}$. As one example, the public key encryption algorithm that can be used is the RSA algorithm, or, for example, El Gamal, although the invention is not limited to these particular public key encryption algorithms. The user calculates the key $K_{OBJ}$ in two steps—first, using the secret key $K_U$, he decrypts the metadata field Data$_i$, and calculates the key $K_C$. Then, he receives the server key $K_S$ from the server, and determines the object key case $K_{OBJ} = K_C$ XOR $K_S$, or $K_{OBJ} = \text{decrypt } K_S (K_C)$.

In the metadata, for each user who has access to the protected object, there is metadata field Data$_i$, the public key $K_{UP}$, and the hash function value hash($K_U \| K_{OBJ}$). The latter value is used when the object key case $K_{OBJ}$ is changed, in order to filter out fictitious users who added their public key into the metadata, without the owners permission.

Additionally, rather than using symmetrical encryption algorithm for protection of an object by using only a single user key, public key infrastructure is used. This refers to the use of a public key for encryption, but a secret key is required for decryption. A number of robust protocols for public key encryption are known, for example, one commonly used algorithm is Diffie-Helman, but others can be used as well. Thus, in order to access the protected object, the identifier of the user is added to the object, as well as his public key and the result of the encryption of the object key $K_{OBJ}$, generated using the public key. The use of public key certificates permits the correspondence of a particular public key to a particular user of category of users.

Thus the approach described herein relies on a number of components to implement the described features, and to address the shortcomings of the conventional art. One component that is used in the cryptographic storage system, as described herein, utilizes a cryptographic key that is generated based on a combination of several elements. This first element is an object key $K_{OBJ}$, which is typically based on the object that is being protected. The second element is a cryptographic key (server key) $K_S$ that is stored on a server, and to which the administrator of the server has access.

The third element is a user key $K_U$, which is discussed further below with reference to FIG. 2.

The approach described herein is not restricted to any particular cryptographic algorithm, for example, AES, DES, Blowfish, Twofish, 3DES, CAST5, RC5, RC6, SEED, Russian GOST 28147, etc. can be used. The selection of the algorithm is primarily a matter of choice for the developer and system administrator, although it is empirically observed that such algorithms as AES or similar, with a sufficiently long key (e.g., 128 bits or longer) are sufficiently robust from most practical applications.

In the discussion herein, the server key $K_S$ is therefore (for example) 128 bits long, the owner key $K_O$ is also 128 bits long, and the object key $K_{OBJ}$ is also typically 128 bits in length. Also, the present invention is not limited to any particular length of the key, although 128 bit keys are currently regarded as sufficiently invulnerable to brute force attacks.

The approach described herein permits removing the system administrator from the position of having access to all the confidential data on the system. Regardless of where the protected objects are located, whether on the local machine connected to a network, or on a server, the most that the administrator will have access to is the server key $K_S$, but this is insufficient to actually decrypt any file or object.

Thus, when an owner of the object needs to access the object, the server key $K_S$ and his own key are necessary to generate the object key $K_{OBJ}$, which in turn is necessary to decrypt the object. Also, this is true regardless of whether the object is stored locally or remotely or on a server, but this is particularly useful in the context of distributed systems, such as corporate networks, where much of the data today is stored not in centralized form, but on individual local machines. Also, the same access scheme applies regardless of whether the file is located on a hard disk drive of a computer, or on removable media. Also, the same scheme applies regardless of whether the user of a particular machine is a non-privileged user, or has managed (legitimately or not) to gain system-level privileges on that machine. In the case of a malicious user, even gaining system-level privileges on one local machine, even one that has confidential data, will not result in compromised data, since that malicious user would still need the server key $K_S$, in order to generate the object key $K_{OBJ}$ for decryption of the object.

Generally, there are several types of objects to which the present invention is applicable. The simplest type of object is a file. Other, more complex (structured) types include folders or directories (i.e., entities that have internal structure), disk partitions, volumes, virtual disk drives/containers (which can be viewed as an entity that, from the perspective of the operating system, functions as a file, but from the perspective of a user who has access to that container, the container has internal structure—such as multiple files, directories, and so on). Another type of object that can be encrypted is an entire disk drive. Yet another type of object is a server dynamic volume, such as sometimes exists (temporarily or permanently or semi-permanently) on servers that work with files.

Generally, regardless of which type of object is at issue, the approach to security of that object is the same—anyone who tries to access the object needs to provide both his own user key $K_U$, and also needs to connect to a server to get the server key $K_S$, in order to generate the object key $K_{OBJ}$, necessary for encryption and (in this case, more importantly) decryption.

One additional aspect that needs to be addressed is the ability of a user to work with protected data when, for whatever reason, he is unable to connect to the server. For example, the network connection could be experiencing problems, the user could be traveling and might not have a connection to the Internet, the user might wish to access the data on a computer that has been intentionally disconnected from the network, and so forth. To address this issue, the server can provide an offline ticket that will enable the user to work with a protected object for a limited amount of time. This is implemented on an application level, where, upon boot up of the computer, and before the operating system is loaded, a special driver is loaded, which will then be able to work with offline tickets. Essentially, the offline ticket is a logical combination of a server key $K_S$ and an expiration time. The server key $K_S$ is stored temporarily by the special driver, and can be used in the same manner as any server key $K_S$. However, once the time period of the offline ticket expires, the stored server key $K_S$ is erased or reset to zero. As such, an attempt after that point to generate the object key $K_{OBJ}$ will obviously fail, and the data will remain encrypted.

It is noted that in theory, a very sophisticated user could defeat this mechanism, and gain access to the server key $K_S$ itself, and gain access to the server key $K_S$ directly, by knowing exactly where the server key $K_S$ is stored by the driver. Alternatively, a very sophisticated user could alter the code of the driver and extend the expiration date of the offline ticket. However, this assumes a very rare confluence of events—at the time that such a malicious user gained access to the computer, there is an offline ticket that is active and has not yet expired on that computer, and that he is sufficiently knowledgeable about the special driver to know where exactly the driver stores the server key $K_S$.

Generally, such a situation is relatively unlikely—the more common situation is that the offline ticket will have a duration no more than is absolutely necessary, as set by the administrator. The other common situation is that even if a laptop is lost, it will be days, or least a reasonable amount of time, before even a sophisticated user (generally having a very high skill level in software reverse assembly), will have physical access to the computer. As such, the risk of data compromise is relatively low. Furthermore, the administrator, if he still considers the risk unacceptable, can, as a matter of policy, not issue offline tickets at all.

Normally, authorization of a user is mandatory prior to working with protected data. Typically, the authorization is done before the operating system is loaded, by connecting to the server. As one example, some OS files that are needed for bootup can be protected, and failure to provide the correct user key will mean that the computer will be unable to boot up.

A user can set the properties of an existing object to being protected. This object can include, as noted earlier, files, folders, physical and logical disk drives, containers, and so on. Normally, an owner who creates the object has the right to select the encryption algorithm (out of those that are supported by the system), the object owner (if not himself) and the mechanism for authorization of the object owner. The user can also create specialized objects—such as container files, i.e., entities that are interpreted by the file system as a file, but which are interpreted by the system under discussion as a virtual/logical disk drive, or as a folder. In other words, these are entities that have internal structure. The user can set the following parameters for the container:

(a) Container type, i.e., hidden (located in the file stream), or a standard file;
(b) Maximum size of the container;
(c) Encryption algorithm, from the list of algorithms supported by the system;
(d) Object owner; and
(e) Authorization mechanism for the object owner.

Note that many file systems permit a user to create a container/file, whose size will gradually increase up until the maximum size, set by the user, as the amount of data stored in the container increases.

The user can also set the protection parameters for files and folders within protected disk drives, including within virtual disk drives. Also, the user can locate container files within a protected folder, or within the file stream, or in a subfolder. The depth of the hierarchy of the protected object is, in theory, unlimited.

Additionally, the user can set protection attributes for remote objects, such as remote files, folders and disks, and to create remote containers. Using a remote access console, the owner can set the user's access to the remote protected object, and set protection parameters for logical drives and partitions on remote drives, including system files and folders, and loader files and folders. Note that the system, as described herein, is compatible with various distributed file systems, such as Microsoft Corporation's DFS.

An user can also perform operations regarding protection settings of logical and physical drives, without interrupting their normal activities, i.e., in the background. Also, in case of an interrupted encryption process (for example, due to a hardware or software glitch on a computer), the owner or user can resume the encryption operation at a location where the encryption process was interrupted. By using the remote control console, an authorized user can activate protected objects (e.g., containers, disks, etc.) on a remote computer, to gain access to protected data therein (i.e., typically, to access files inside the containers).

When an owner sets the user's access to a protected object, he can use password, a user's secret key or a certificate of a user's public key.

A user who has access to a protected object, has access to that object because he has a password or a key $K_U$ for that protected object. A user who has access to a folder has access to all the files in the folder, but not necessarily access to all the folders within the protected folder (i.e., he will not have access to protected folders with the protected folder unless he is authorized, but he will have access to unprotected folders). In other words, having access rights to the folder only gives the user access to files within the folder and any folders that do not have an additional layer of protection on them.

The mechanism works similarly for accessing a remote object, such as those stored on network storage, on Internet storage, etc. Note that all network interactions between the remote storage device and the user's computer are also encrypted—in other words, the remote storage device itself will only "see" an encrypted form of a protected object.

The user can also change his own password/key for accessing a protected object, without a need to interact with other users of the same object.

In order to store secret keys, the user can use files and electronic keys according to ETOKEN or RUTOKEN (which are flash-disk type USB connectable hardware that stores passwords and keys in protected form). Regardless of the storage medium, whether removable or not, the user can perform the following operations with the secret keys:

(a) Generate a new secret key;
(b) Protect his secret key using a password, and change the password at any time;
(c) Copy the secret key from one storage medium to another;
(d) Delete those secret keys which are no longer necessary;
(e) Use his secret key for authorization and/or access to a protected object; and
(f) Initiate the procedure of generating a certificate for a corresponding open key.

Secret keys are processed during the authorization stage of the user when the operating system is loaded.

Additionally, the user has the option to protect the loader file of the operating system. Also, the user has the option to erase the file, or secure wipe the file, prior to its deletion. Additionally, the user can turn off or on various components that are responsible for remote interaction, protection of swap files, as well as working with particular types of protected objects, i.e., logical disks, physical disks, virtual disks, folders and containers.

The owner of the object has all the rights that a user has, as well as some additional rights. Specifically, the owner can provide access to the object to multiple users, and control the type of access to the object by those users. The owner of the object can determine the access method for each user, using anyone of the three methods—password based, secret key based, or a certificate of an open key based. The user can use the same password or key for access to multiple protective objects.

The hierarchical structure of the data permits the owner to define, for each user, the subfolders to which he will have access. By having access to a subfolder, the user automatically has access to all the files within that folder, as well as to any unprotected folders within that folder.

Additionally, the owner of a protected object can also block the process of changing the protection settings of the disk and container, resume the process, or roll back the state of the protected object to a previous state. This is done by maintaining two different protected regions, one of which stores a prior state of the data in one region, and stores a new state of the data in the second region. During the process of encryption, re-encryption or decryption, the data of the prior state (i.e., first region) is gradually transferred to the second region. Thus, as long as the final state is not reached, roll back is possible. Once the final state is reached, there is no point in keeping the prior state of the data.

It should also be noted that an encryption of a relatively large object, such as an entire disk drive or a partition, can take a relatively long time. In order to avoid interrupt rendering the computer slow (or even useless) during the entire time that the disk drive is being encrypted, it is possible to divide the disk drive into two regions—one region contains the data in the state prior to encryption, and the other region contains the data in the encrypted state. Gradually, information is "pumped" from one region to another, therefore, the first region continues to shrink, and the second region continues to increase, until all the relevant data is now encrypted. This process is performed in the background. Any access requests to the unprotected portions of the disk drive continues to be performed in a normal manner, and any access requests to the protected portion or object is performed using transparent encryption. Note that in the background regime, the open portion is continually shrinking, while the encrypted portion continues to increase (this may be repetitive). Generally, it is advisable to inform the user at least at some point that the encryption process is ongoing, so that the user is aware that at least until the process is completed, security for the disk is not yet enforced.

The owner of a remote protected object can perform all the same operations, as if the object were local to his computer. Also, the owner of a protected object has access to metadata of the object and access to data about the users who have access to the object (by forming the metadata for each particular user, where the metadata includes the userID/public key of the user who has access to the object).

The following are the rights of the administrator of the server:

(a) The administrator has the right to add new administrators and delete old administrators from the system. The administrator also can give access to confidential information to selected users, and remove that access from other users. However, the administrator himself does not have access to protected information.

(b) The administrator can initiate the recall procedure for a certificate of a public key of a user.

(c) Also, the administrator can analyze how users work with confidential information, maintain logs and journals of how the users access the information, and so on. The logs can, for example, contain the following parameters: time stamps, users, computer from which the user was accessing the data, type of protected object being accessed, and operation types.

(d) The administrator also can set policies, and edit policies that define the users ability to access and work with confidential information. These rules/policies can perform the following functions:

(a) Define, for each user, the location of protected objects with which he can work;

(b) Define for each user the time restrictions on when he can work with the protected objects;

(c) Define the types of protected objects that a user can access;

(d) Permit or forbid creation of new protected objects;

(e) Permit or forbid removal of protection from a protected object;

(f) Permit or forbid the user to regulate the list of users who have access to the protected object;

(g) Permit or forbid the use of a console for remote management of protected object;

(h) Permit or forbid working with protected objects outside the corporate network;

(i) Permit or forbid the protocolling and/or logging of individual actions by the user;

(j) Permit or forbid the user to change his security system settings, on his work station.

Additionally, the administrator can set conditions for each rule, that define when the rules will be enforced. For examples, such rules can include whether the user can work offline (and a list of actions permitted for working with offline, a list of objects permitted for working with offline, types of objects that are permitted to work with offline. Verification of whether the rules are enforced is done using plug-ins, in one embodiment. Alternatively, the rules can be hard-coded. Also, the administrator can see the list of all the protected objects within the corporate network (but not have access to the data in the objects themselves).

Additionally, a separate plug-in may be employed for a user to work with protected information outside the corporate network.

A recovery agent, as noted earlier, is a special user of each protected that, combined with other such users (and only in that case), can gain access to the object. The following are the rights of the recovery agent:

If a key is lost for a particular object, several recovery agents, if present in a sufficient quorum, can appoint a new owner of an object. Note that the recovery agents themselves individually do not have access to the object. The recovery scheme is based on a classic 1979 paper by Adi Shamir, "How to Share a Secret", which proved mathematically that given a piece of information (in this particular instance, the key), the piece of information can be transformed into N pieces of information, such that any K pieces out of N are sufficient to recover the original piece of information, but fewer than K pieces is guaranteed to be insufficient. Such algorithms are sometimes known as (N, K) algorithms. In the present case, each such recovery agent receives a binary value, which is derived from the key. The administrator (or the owner) can set the number N, and the number K. For example, the number N, i.e., the number of recovered agents for a particular object, could be 5, while the number K (the minimum number of recovery agents necessary to recover the object key $K_{OBJ}$) could be 3.

It should also be noted that as one option, all the recovery agents can be the same for all the objects—in other words, same group of people within the corporate organization can be designated as the recovery agents for every protected object. As an alternative, different objects can have different sets of recovery agents. As yet another option, the number of recovery agents needed in order to recover the key can be different for different protected objects, depending on the information contained in the object, and the degree of security for that information.

Note that with regard to the recovery agents, by "gathering" in a sufficient quorum, and with their own secret keys, they can calculate a single recovery key using an (N,K) algorithm. This "quasi" user, with the recovery key, then has access to the object, with the difference that the server key $K_S$ is not used when forming the metadata field $Data_i$. This permits calculation of the object key $K_{OBJ}$, in the absence of the server key $K_S$. This quasi-user then has the right to appoint new owners and users for the object.

Figure 1:
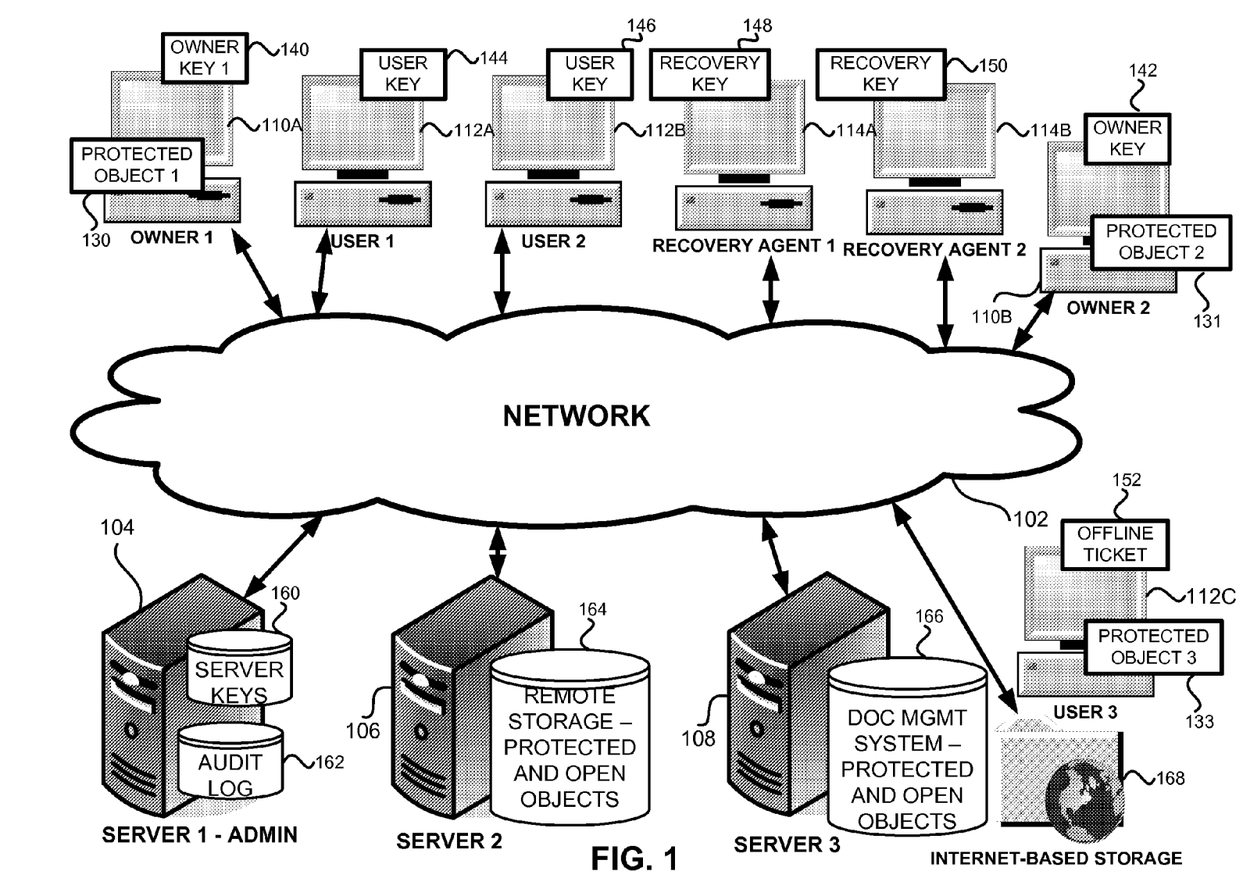
FIG. 1 shows an overall architecture of the present invention.

FIG. 1 illustrates an exemplary architecture of one embodiment of the present invention. As shown in FIG. 1, a number of users are connected to a corporate network 102. The invention is not particularly limited to any particular type of network, for example, this can be an Ethernet-type network, a virtual private network, and so on. In other words, any known mechanism for connecting various elements that are illustrated in FIG. 1 is acceptable.

Also shown in FIG. 1 are two owners 110A, 110B. Owner 110A owns a protected object 130, which has an owner key $K_O$ 140. Owner 110B owns a protected object 131, with a corresponding owner key $K_O$ 142.

Also shown in FIG. 1 is a server 104, which can be viewed as an administrative server. The administrative server includes a set of server keys $K_S$ 160, and an audit log 162. Another server 106 functions as a remote storage (the server 106 can be an actual physical server with a disk drive, or can be a network storage element, a RAID, and so on). The remote storage 164 can store two types of objects—both protected objects, as well as open objects, i.e., objects, such as regular files and directories, that do not have any encryption.

Also shown in FIG. 1 is an optional server 108, with a document management system, such as IManage, or other similar types of document management systems. The document management system can also store both open objects and protected objects. Note that in this case, for a document management system, the types of object may be restricted—for example, only files may be protected in a typical document management system, but not necessarily structured objects, such as directories, containers, partitions and so on.

Also shown in FIG. 1 is remote storage 168, such as Internet-based storage. In essence, the exact location of the protected object is not as important as the protection scheme itself—regardless of where the protected object is stored, accessing the protected object requires two keys—a server key $K_S$ and the user key $K_U$ or owner key $K_O$. Essentially, the owner key $K_O$ and the user key $K_U$ function in the same manner, from a cryptographic perspective—the difference between a user and an owner is in terms of administrative rights with regard to a protected object. Internet storage is used as an environment or a mechanism for exchange of protected containers (normally, protected files or folders alone would not be stored on the Internet—they would first need to be copied to some form of local storage or to the corporate network).

Also shown in FIG. 1 are three users, user1 (112A), user2 (112B), and user3 (112C). User1 and user2 have their respective keys 144, 146, which, in this example, can be used to access protected object 1 (130). User3 (112C) is at the moment not connected to the network. This user has a new object on his local computer that corresponds to the protected object3 (133), which is encrypted. An offline ticket 152 is used by user3 to access protected object3. Note that copies of protected objects can be created only for containers (e.g., by making a copy of a file which represents a container). Other protected objects are not normally copied, although the user can, obviously, copy the data in one protected object to another, but the protected objects themselves will be different objects, with different keys and different lists of users who have access to them. Obviously, after disconnecting from the network, the user can work with his local copy of the container, but, in the general case, the user works with protected objects on his computer. This includes OS loader and OS data/system disk.

Also shown in FIG. 1 are two recovery agents, recovery agent1 (114A) and recovery agent2 (114B). Each one has a corresponding recovery key (148, 150), which can be used to regenerate an object key $K_{OBJ}$ for (in this example) protected object 1.

As will also be appreciated, most real life corporate networks have many more users than are illustrated in this figure. Also, in a typical situation, the number of recovery agents is greater than is shown here. Also, the distribution of various server functionality (such as the server keys $K_S$ 160, the audit log 162, remote storage 164 and document management system 166) can be variously distributed among more or fewer servers, and the technical implementation details do not affect the access policies and access scheme as described herein.

Figure 2:
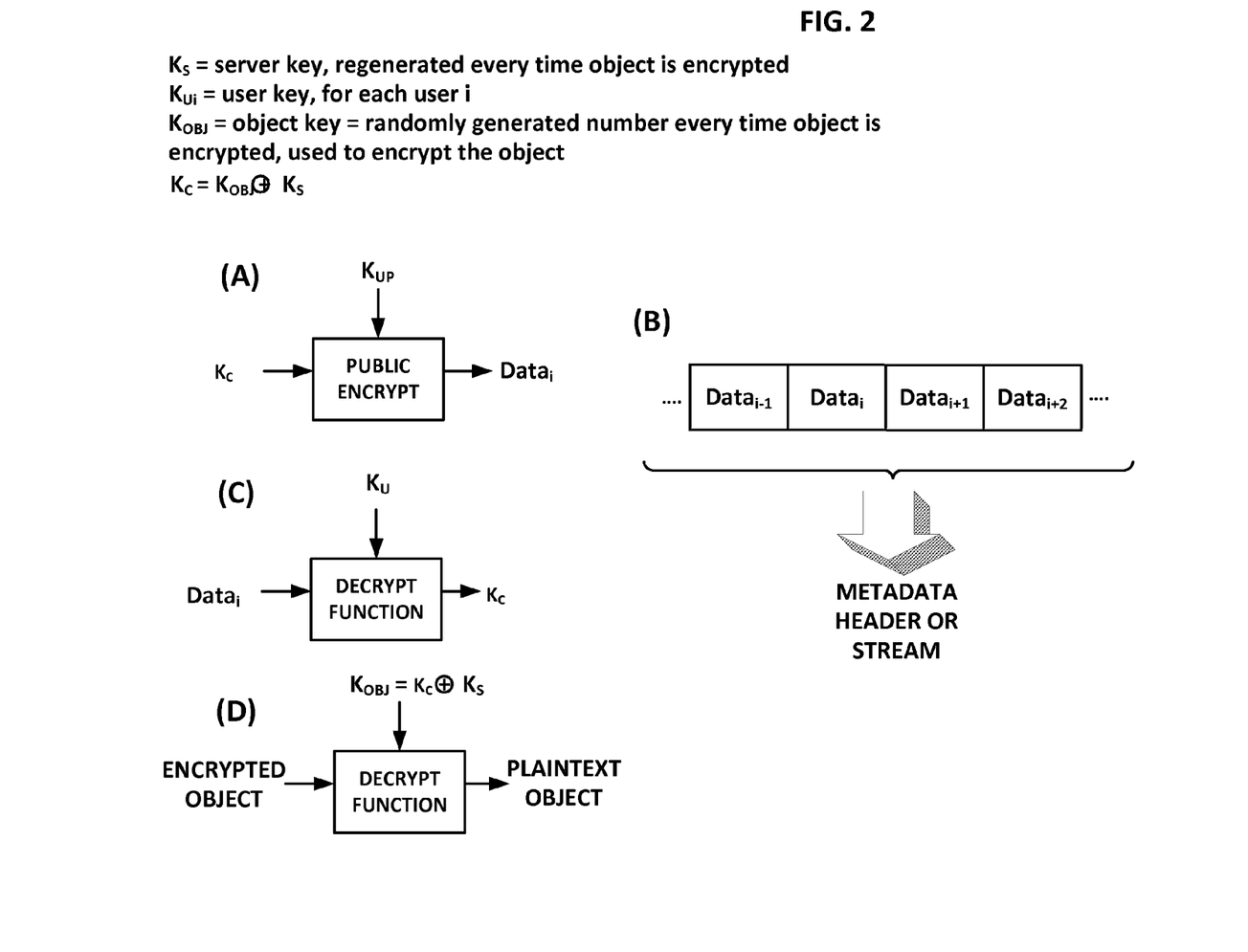
FIG. 2 illustrates the cryptographic basis for the present invention.

FIG. 2 illustrates in block diagram form how the various elements of encryption and decryption and the keys are utilized. As shown in FIG. 2A, the metadata field $Data_i$ is generated by encrypting the combination key $K_C$ using the user's public key $K_{UP}$. i, in this context, refers to a particular user, generally, i ranges from 0 or 1, up to the maximum number of users in the system, or, alternatively, up to the maximum number of users permitted to access this particular object.

As further shown in FIG. 2B, the various $Data_i$ are stored in a special metadata field. The metadata field, which combines all the $Data_i$ for all the users who have access to this object, is typically stored separately from the file itself, although, strictly speaking, that is not a cryptographic requirement. The metadata can also be stored in the form of a header, or provided in the form of a file stream, or as part of the file stream.

As shown in FIG. 2C, in order to generate the combination key $K_C$, the metadata field $Data_i$ is decrypted using the user's secret key $K_U$. The output of the decryption function is, as noted earlier, the key $K_C$. As shown in FIG. 2D, the decryption algorithm is used to decrypt the encrypted object using the key $K_{OBJ}$, which is a combination of the key $K_C$ and $K_S$ (either XOR or hashing).

As noted earlier, one of the problems in storing encrypted data on real-life devices, such as hard disk drives, is the fact that most file systems, when working with disk drives, rely on relatively large units of storage, such as blocks (sometimes called sectors), which are typically 512 bytes, or 1024 bytes in size (on some drives, the sector is 4,098 bytes in length). This means that, using a conventional approach to simply encrypting data in the form of a stream, a change in one bit in the plaintext will result in only a localized change in the sector. This typically occurs due to the fact that most block ciphers, such as those that form the basis of AES or DES, use relatively small blocks, such as 8, 16 or 32 bytes.

To address this issue, in one embodiment of the invention, a hash function value is generated for each plaintext block, for those objects which are protected. The hash function value is then used as an initialization vector (IV) for the block cipher. The disk sector is then encrypted, using the appropriate object key $K_{OBJ}$ and the newly generated initialization vector. Thus, the smallest "localized" unit in the encrypted ciphertext that can be identified as having changed is the disk sector. This permits working with sectors and clusters (which are groups of sectors) as one would with conventional storage devices, without having to significantly modify the mechanism of interacting with the actual disk hardware.

The following describes an encryption regime that permits the use of known block encryption algorithms on files and objects that are as small as two bytes, up to any arbitrary file size (not limited to being an integer number of sectors), and without giving away information about localized changes in the plaintext. Let:

$P=(p_1, \ldots, p_n)$—n bits of plaintext $C=(c_1, \ldots, c_n)$—n bits of ciphertext $Y=E_k(X)$—encryption function of the block cipher, where $X=(x_1, \ldots, x_N)$, $Y=(y_1, \ldots, y_N)$ N-bit text blocks, N—block size of the algorithm, in bits K—encryption key The parameters n, N satisfy the condition $n \leq 2*N$ $IV=(iv_1, \ldots, iv_N)$—initialization vector for the particular block cipher, and is an open parameter $RC_i=(rc_1, \ldots, rc_N)$ i=1, 2, . . . —constants of the encryption rounds. N-bit blocks that differ from each other, and their number is equal to the number of encryption rounds. The values of the constants are open parameters.

$BL=(bl_1, \ldots, bl_{sl})$ sl-bit text block $BR=(br_1, \ldots, br_{sr})$ sr-bit text block n=sl+sr sl=sr if n is even, sl=sr+1 if n is odd.

$B=(b1, \ldots, bn)=(BL,BR)=(bl_1, \ldots, bl_{sl}, br_1, \ldots, br_{sr})$ n-bit text block, divided into two parts as follows:

⊕—bitwise addition (XOR, based on mod 2).

Define the functions FL(IV,RC,BL) and FR(IV,RC,BR) as follows:

$\{i_1, \ldots, i_{sr}\}, \{j_1 \ldots, j_{sl}\}$—a fixed set of indices, for each n and for each implementation.

All the i's are different, and all the j's are different.

$(y_{i1}, \ldots, y_{isr})=FL(IV,RC,BL)$, where $Y=(y_1, \ldots, y_N)=E_K(X)$, while the argument of X is generated as follows:

1. $X=(x_1, \ldots, x_N)=IV \oplus RC$
2. $x_{j1}=x_{j1} \oplus bl_1, \ldots, x_{jsl}=x_{jsl} \oplus bl_{sl}$ $(y_{j1}, \ldots, y_{sl})=FR(IV,RC,BR)$, where $Y=(y_1, \ldots, y_N)=E_K(X)$, 1. $X=(x_1, \ldots, x_N)=IV \oplus RC$
2. $x_{i1}=x_{i1} \oplus br_1, \ldots, x_{isr}=x_{isr} \oplus br_{sr}$ Note that in the proposed encryption regime, and without a loss of generality, it is possible to consider the input fixed set of indices $\{i_1, \ldots, i_{sr}\}$ for the function $FR_{()}$ need not correspond to the output of the function $FL_{()}$. It is sufficient that the number of indices be the same. Also, the same applies to the set $\{j_1, \ldots, j_{sl}\}$.

Figure 3:
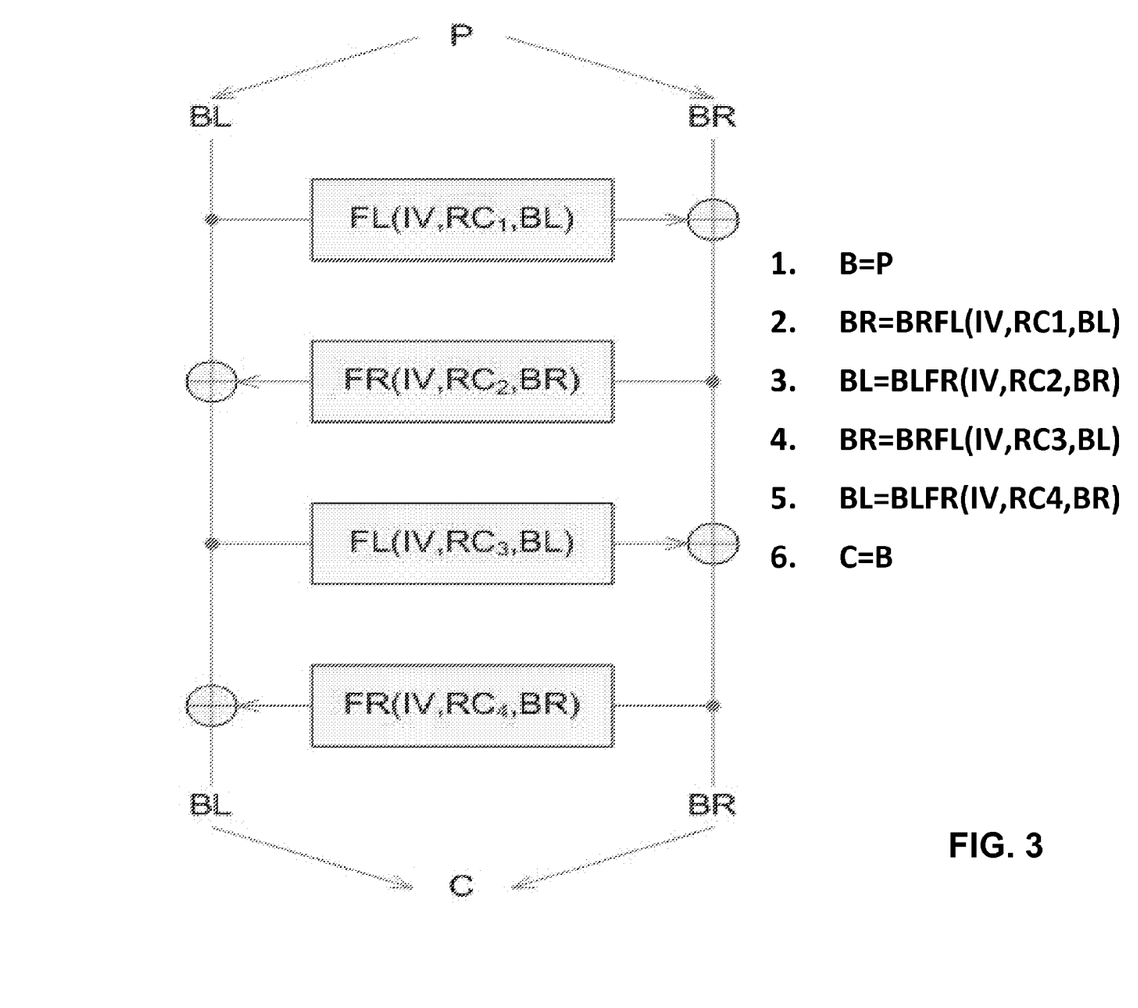
FIGS. 3-4 illustrate the handling of encrypted objects that avoids the problem of detection of localized changes in the plaintext.
Figure 4:
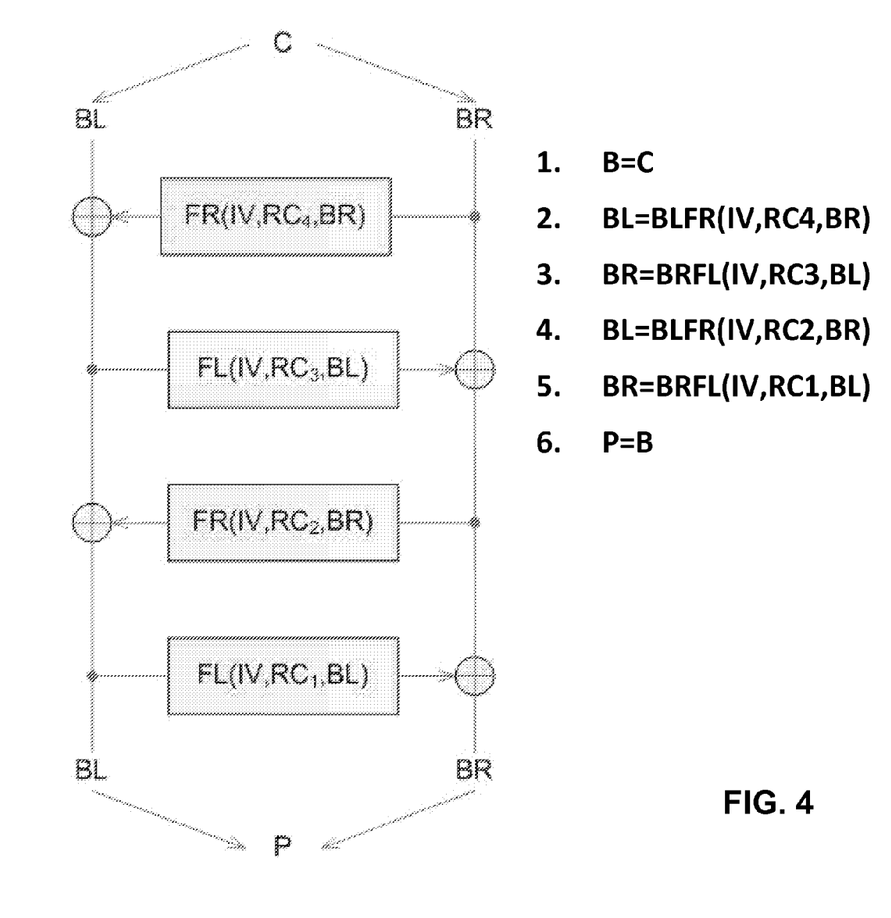

The above discussion is illustrated in FIGS. 3 and 4. FIG. 3 illustrates the encryption process, and FIG. 4 illustrates the decryption process, using four rounds in each case.

Note that by using standard block encryption algorithms, it is possible to use an alphabet formed of N-bit letters (i.e., binary vectors), which means that this alphabet inherits all the advantages and disadvantages of the use of the electronic code book (ECB) regime for alphabets of a corresponding strength, i.e., $2^N$. The main danger is, obviously, the risk of a keyless reading of the ciphertext, by generating an appropriate alphabet.

In the present case, for each implementation of such an ECB regime, the substitution table substantially depends on the key K and the initialization vector IV. Preferably, the number of rounds should be at least 4, since, with only 3 rounds, and with an appropriate choice of input, it is possible to roll back the transformations, in the form of a dictionary, with $2^{N/2}$ number of iterations.

Also, for encryption and decryption using this approach, as well as in the CFB (cipher feedback), OFB (output feedback) and counter gamma generation in the counter regime (CTR), the same transformation of the block algorithm is used, therefore, the same initialization keys can be used for both encryption and decryption. This permits implementing this approach in a more compact and convenient manner.

To avoid losing information during the process of encryption of an object for the first time, the following approach can be used. For a hard disk drive, the next sector or block that is being encrypted is first copied to a region in memory, is encrypted, and then copied to the same location on the disk, in encrypted form. Thus, if power is lost during the process, it is always possible to identify where the encryption was interrupted, and resume from there.

For encryption of existing folders, the original folder is renamed, and a new folder is created with the same name as the original folder. The results of the encryption will be placed into the newly created folder with the old name. In the renamed folder, the objects are removed once they are stored in encrypted form. Thus, data is never lost—it is always present either in open form, or in encrypted form.

In order to support a "hot" regime of enabling or disabling protection, a disk with two regions can be used—one region containing open information and other region containing protected information. Gradually, data can be copied from the first region to a second region, and encrypted, as necessary.

As yet a further option, each protected folder and each file in the protected folder can be provided with a secret identifier SID, which is stored together with the SID of a folder or container or volume in which this protected folder or file is located. Storage of the pair SIDs (of the object itself and of the folder/container in which it is located) is done in encrypted form, using the object key $K_{OBJ}$. Access to the object requires calculation of the encryption key of the object, $K_{OBJ}$. The SID pair is also decrypted using the same, to verify that the SID of the folder/container is specified correctly. Without a key for accessing the folder, the malicious user cannot determine its SID, and, therefore, cannot add any files (such as fictitious stubs) to the protected folder.

It should also be noted that in order to defeat an attempt by a malicious user to subvert the security, a special loader is used, which is activated once the BIOS is loaded into memory, and before the operating system is loaded into memory. The special loader connect to the server, and, upon receipt of a key, can then decrypt at least some portion of the operating system (or at least some minimal portion of which is necessary to continue). The operating system can then load, including any protected areas of the operating system (or optionally, all of the operating system files can be treated as protected objects).

Furthermore, in order to prevent creation of unauthorized plaintext copies (such as temporary files, and so on), a special driver is added, to replace normal operating system drivers that work with storage media. The special driver reader intercepts attempt to read and write to the disk, regardless of the source of the disk access request (whether an application accessing the disk drive in the normal course of its activity, or wither making a temporary copy of a file, and so on). Thus, transparently to the user, the interaction between any program attempting to read and write to the disk, for whatever reason, and regardless of where the disk is physically located (locally, remotely, etc.), such a disk access attempt would inherently trigger encryption/description of any object that are protected. In the case of temporary files, they would be similarly encrypted/decrypted, the only difference being that such temporary files would be destroyed/deleted when the application no longer needs them. As yet a further option, all temporary files, which are "known" as temporary files, for example, from their extension, or through any other mechanisms, can be periodically deleted, or deleted upon shutdown of the computer, or deleted upon boot-up, etc.

Figure 5:
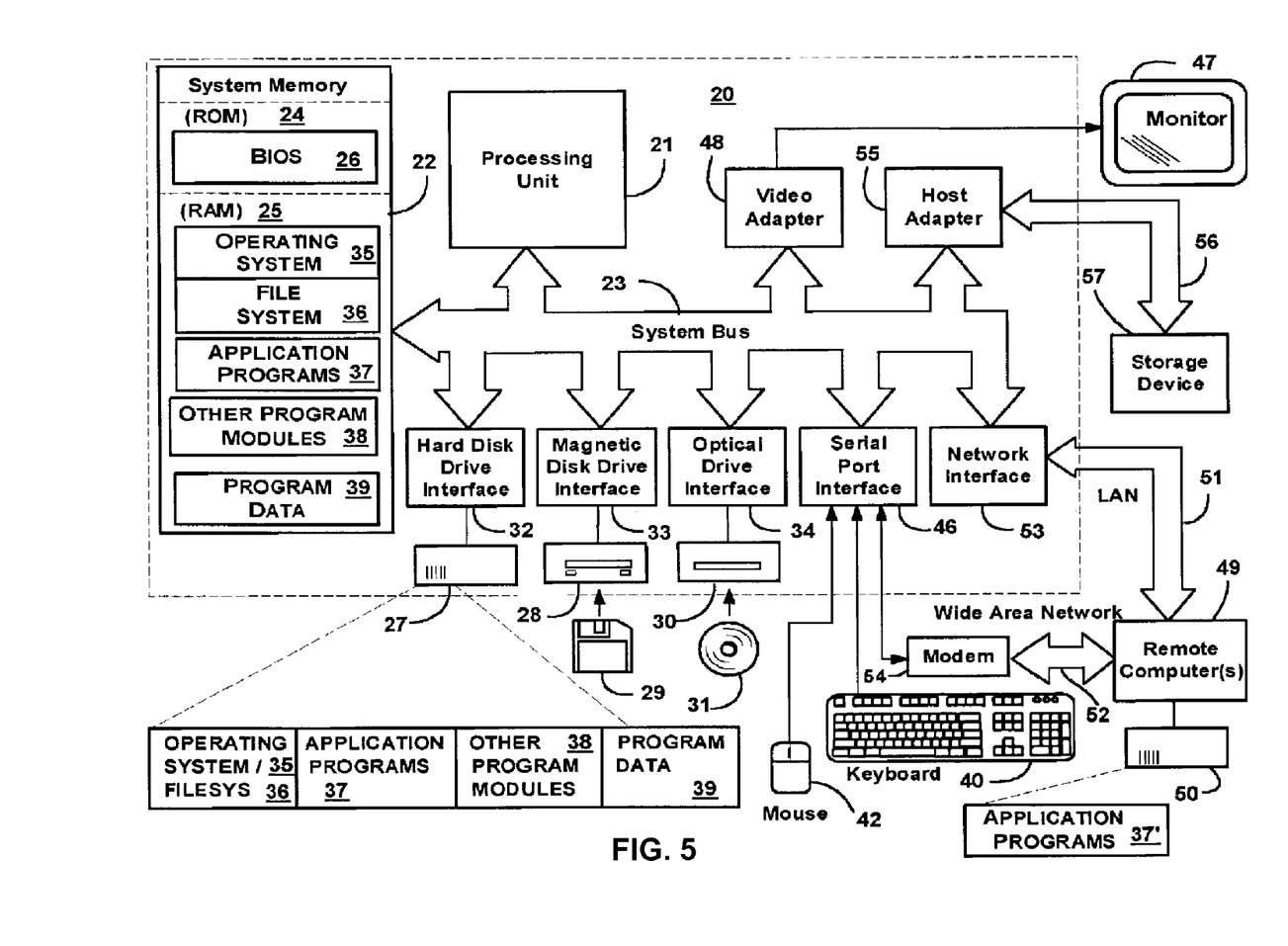
FIG. 5 illustrates an exemplary computer system on which the invention may be implemented.

With reference to FIG. 5, an exemplary system for implementing the invention includes a general purpose computing device in the form of a computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 6. The logical connections depicted in FIG. 6 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A computer-implemented method for controlling access to protected objects in a distributed environment, the method comprising:
    on a local computer having a processor, a data storage and a memory, encrypting an object using a randomly generated object key $K_{OBJ}$;
    receiving, from a user, at the local computer, a public key $K_{UP}$ of the user;
    receiving, at the local computer, a server key $K_S$ from a remote server;
    on the local computer, protecting the object key $K_{OBJ}$ by converting the object key $K_{OBJ}$ to a combination key $K_C$ using a server key $K_S$, by either XORing the object key $K_{OBJ}$ and the server key $K_S$, or by encrypting the object key $K_{OBJ}$ using the server key $K_S$;
    generating, on the local computer, for each user who has access to the protected object, a metadata field $Data_i$ by encrypting the combination key $K_C$, using the public key $K_{UP}$;
    storing the metadata field $Data_i$ on the storage device;
    providing, to the local computer, a user key $K_U$ corresponding to the public key $K_{UP}$;
    obtaining the combination key $K_C$ by decrypting, on the local computer, a metadata field $Data_i$ using the key $K_U$, wherein the public key $K_{UP}$ is used to generate the metadata field $Data_i$, and wherein the metadata field $Data_i$ is stored on the data storage together with a protected object's metadata;
    sending a request, from the local computer to a remote server, to permit to the user to access the protected object;
    receiving, at the local computer, a server key $K_S$ from the remote server;
    calculating, on the local computer, the object key $K_{OBJ}$ from the combination key $K_C$ and the server key $K_S$ by either XORing the combination key $K_C$ and the server key $K_S$, or by decrypting the combination key $K_C$ using the server key $K_S$; and
    decrypting, in the memory of the local computer, the protected object using the calculated object key $K_{OBJ}$, to thereby give the user access, on the local computer, to the protected object.

2. The method of claim 1, further comprising storing the protected object on local storage.

3. The method of claim 1, further comprising storing the protected object on remote storage.

4. The method of claim 1, wherein the protected object is any of a file, a folder, a volume, a partition, a container, a disk drive, and a dynamic volume.

5. The method of claim 4, further comprising giving a user, who has access to the protected object having structure, access to any unprotected file or unprotected structured object inside the structured protected object, but not access to any structured protected object without an additional key.

6. The method of claim 1, further comprising using transparent encryption to interface to the storage device on which the protected object is stored, such that any copy of the protected object is always encrypted when present on the storage device and is unencrypted when located in the memory.

7. The method of claim 1, wherein each protected object includes several $Data_i$ and further comprising decrypting the same $Data_i$ into the object key $K_{OBJ}$ using several derivative keys generated by an (N,K) algorithm.

8. The method of claim 1, further comprising, for any protected object, when storing the protected object in encrypted form, generating a hash value for each plaintext unit of the protected object that corresponds to a portion of a disk sector, and using the hash value as an initialization vector for encryption of the protected object.

9. The method of claim 1, wherein each structured protected object has a unique secret identifier (SID), and each file within a structured protected object has a unique secret identifier (SID), wherein both SIDs are stored together in encrypted form, and further comprising using both SIDs to control integrity of a structure of the structured protected object.

10. The method of claim 1, further comprising maintaining a log of accesses of the protected objects based on requests to the server for the server keys.

11. A non-transitory computer-readable storage medium encoded with computer-executable instructions that, when executed by a local computer having a processor, a data storage and a memory, causes the computer to perform the steps of:
- on a local computer having a processor, a data storage and a memory, encrypting an object using a randomly generated object key $K_{OBJ}$;
- receiving, from a user, at the local computer, a public key $K_{UP}$ of the user;
- receiving, at the local computer, a server key $K_S$ from a remote server;
- on the local computer, protecting the object key $K_{OBJ}$ by converting the object key $K_{OBJ}$ to a combination key $K_C$ using a server key $K_S$, by either XORing the object key $K_{OBJ}$ and the server key Ks, or by encrypting the object key $K_{OBJ}$ using the server key $K_S$;
- generating, on the local computer, for each user who has access to the protected object, a metadata field $Data_i$ by encrypting the combination key $K_C$, using the public key $K_{UP}$;
- storing the metadata field Data, on the storage device;
- providing, to the local computer, a user key $K_U$ corresponding to the public key $K_{UP}$;
- obtaining the combination key $K_C$ by decrypting, on the local computer, a metadata field $Data_i$ using the key $K_U$ wherein the public key $K_{UP}$ is used to generate the metadata field $Data_i$ and wherein the metadata field $Data_i$ is stored on the data storage together with a protected object's metadata;
- sending a request, from the local computer to a remote server, to permit to the user to access the protected object;
- receiving, at the local computer, a server key Ks from the remote server;
- calculating, on the local computer, the object key $K_{OBJ}$ from the combination key $K_C$ and the server key Ks by either XORing the combination key $K_C$ and the server key Ks or by decrypting the combination key $K_C$ using the server key Ks; and
- decrypting, in the memory of the local computer, the protected object using the calculated object key $K_{OBJ}$, to thereby give the user access, on the local computer, to the protected object.

12. A system for controlling access to protected objects, the system comprising:
- a local computer having a processor, a memory, and a local storage medium storing a protected object;
- on a local computer having a processor, a data storage and a memory, means for encrypting an object using a randomly generated object key $K_{OBJ}$;
- means for receiving, from a user, at the local computer, a public key $K_{UP}$ of the user;
- means for receiving, at the local computer, a server key $K_S$ from a remote server;
- on the local computer, means for protecting the object key $K_{OBJ}$ by converting the object key $K_{OBJ}$ to a combination key $K_C$ using a server key $K_S$, by either XORing the object key $K_{OBJ}$ and the server key $K_S$, or by encrypting the object key $K_{OBJ}$ using the server key $K_S$;
- means for generating, on the local computer, for each user who has access to the protected object, a metadata field $Data_i$ by encrypting the combination key $K_C$, using the public key $K_{UP}$;
- means for storing the metadata field $Data_i$ on the local storage medium;
- means for providing, to the local computer, a user key $K_U$ corresponding to the public key $K_{UP}$;
- means for obtaining the combination key $K_C$ by decrypting, on the local computer, a metadata field $Data_i$ using the key $K_U$, wherein the public key $K_{UP}$ is used to generate the metadata field $Data_i$, and wherein the metadata field $Data_i$ is stored on the data storage together with a protected object's metadata;
- means for sending a request, from the local computer to a remote server, to permit to the user to access the protected object;
- means for receiving, at the local computer, a server key $K_S$ from the remote server;
- means for calculating, on the local computer, the object key $K_{OBJ}$ from the combination key $K_C$ and the server key $K_S$ by either XORing the combination key $K_C$ and the server key $K_S$, or by decrypting the combination key $K_C$ using the server key $K_S$;
- means for decrypting, in the memory of the local computer, the protected object using the calculated object key $K_{OBJ}$, to thereby give the user access, on the local computer, to the protected object; and
- means for providing for any user, who has access to the protected object having structure, with access to any unprotected file or unprotected structured object stored inside the structured protected object on the local storage medium, but not with access to any structured protected object, without an additional key.

13. The system of claim 12, wherein the protected object is any of a folder, a volume, a partition, a container, a disk drive, and a dynamic volume.

14. The system of claim 12, wherein a user who has access to the structured protected object has access to any unprotected file or unprotected structured object inside the structured protected object, but does not have access to any structured protected object or without an additional key.

15. The system of claim 12, wherein transparent encryption is used to interface to a storage device on which the protected object is stored, such that any copy of the protected object is always encrypted when present on the storage device.

16. The system of claim 12, wherein each protected object includes several $Data_i$ such that same $Data_i$ can be decrypted into the object key $K_{OBJ}$ using several derivative keys generated by an (N,K) algorithm.

17. The system of claim 12, wherein, for any protected object stored in encrypted form, a hash value for each plaintext unit of the protected object that corresponds to a disk sector is used as an initialization vector for encryption of the protected object.

18. The system of claim 12, further comprising a loader that is activated prior to loading an operating system into memory, wherein the loader requires a user key and a server key received from the administrative server to permit decryption of operating system files.

19. The system of claim 12, wherein an offline ticket of limited time duration is provided from the administrative server to enable access to the protected object if the computer system is offline.

* * * * *